United States Patent
Sternå et al.

(10) Patent No.: US 11,046,001 B2
(45) Date of Patent: Jun. 29, 2021

(54) PRINT BEDS, 3-D PRINTERS, METHODS AND COMPUTER PROGRAMS FOR REGULATION OF A TEMPERATURE OF A PRINT BED

(71) Applicant: Cellink AB, Gothenburg (SE)

(72) Inventors: Erik Sternå, Mölndal (SE); Jockum Svanberg, Gothenburg (SE); Erik Gatenholm, Gothenburg (SE); Hector Martinez, Gothenburg (SE)

(73) Assignee: Cellink AB, Gothenburg (SE)

( * ) Notice: Subject to any disclaimer, the term of this patent is extended or adjusted under 35 U.S.C. 154(b) by 142 days.

(21) Appl. No.: 16/005,980

(22) Filed: Jun. 12, 2018

(65) Prior Publication Data

US 2018/0361667 A1 Dec. 20, 2018

Related U.S. Application Data

(60) Provisional application No. 62/520,802, filed on Jun. 16, 2017.

(51) Int. Cl.
*B29C 64/295* (2017.01)
*B33Y 30/00* (2015.01)
(Continued)

(52) U.S. Cl.
CPC .......... *B29C 64/295* (2017.08); *B29C 64/245* (2017.08); *B29C 64/393* (2017.08);
(Continued)

(58) Field of Classification Search
None
See application file for complete search history.

(56) References Cited

U.S. PATENT DOCUMENTS

2015/0174824 A1 6/2015 Gifford et al.
2015/0190968 A1* 7/2015 Griszbacher ........... B33Y 30/00
264/40.6

(Continued)

FOREIGN PATENT DOCUMENTS

EP 3 002 112 A1 4/2016
EP 3 069 816 A2 9/2016

OTHER PUBLICATIONS

Extended European Search Report prepared by European Patent Office for corresponding application EP 18175589.3 dated Oct. 23, 2018.

*Primary Examiner* — Matthew J Daniels
*Assistant Examiner* — Paul Spiel
(74) *Attorney, Agent, or Firm* — McCarter & English, LLP

(57) ABSTRACT

The present disclosure relates to a print bed (1) for regulating a temperature of the print bed (1). The print bed (1) comprises at least one Peltier element (2), each Peltier element having opposite first and a second surfaces (3a, 3b). The print bed (1) further comprises at least one heatsink (4). The at least one Peltier element (2) is arranged to have each respective first surface (3a) facing a print surface (5) of the print bed (1). The at least one heatsink (4) is thermally connected to the Peltier element (2) and arranged to transfer heat generated by the at least one Peltier element (2) and dissipate the transferred heat away from the at least one Peltier element (2). The present disclosure further relates to corresponding 3D-printers, methods, computer programs and modules.

9 Claims, 3 Drawing Sheets

(51) Int. Cl.
*B29C 64/245* (2017.01)
*B33Y 50/02* (2015.01)
*B29C 64/393* (2017.01)
*F25B 21/04* (2006.01)

(52) U.S. Cl.
CPC ............... *B33Y 30/00* (2014.12); *B33Y 50/02* (2014.12); *F25B 21/04* (2013.01)

(56) References Cited

U.S. PATENT DOCUMENTS

| | | | |
|---|---|---|---|
| 2016/0096326 A1* | 4/2016 | Naware | B29C 64/106 |
| | | | 425/143 |
| 2017/0252820 A1* | 9/2017 | Myerberg | B22F 3/008 |
| 2018/0169942 A1* | 6/2018 | Jessen | B29C 64/20 |
| 2018/0207850 A1* | 7/2018 | Stockett | B29C 64/336 |

* cited by examiner

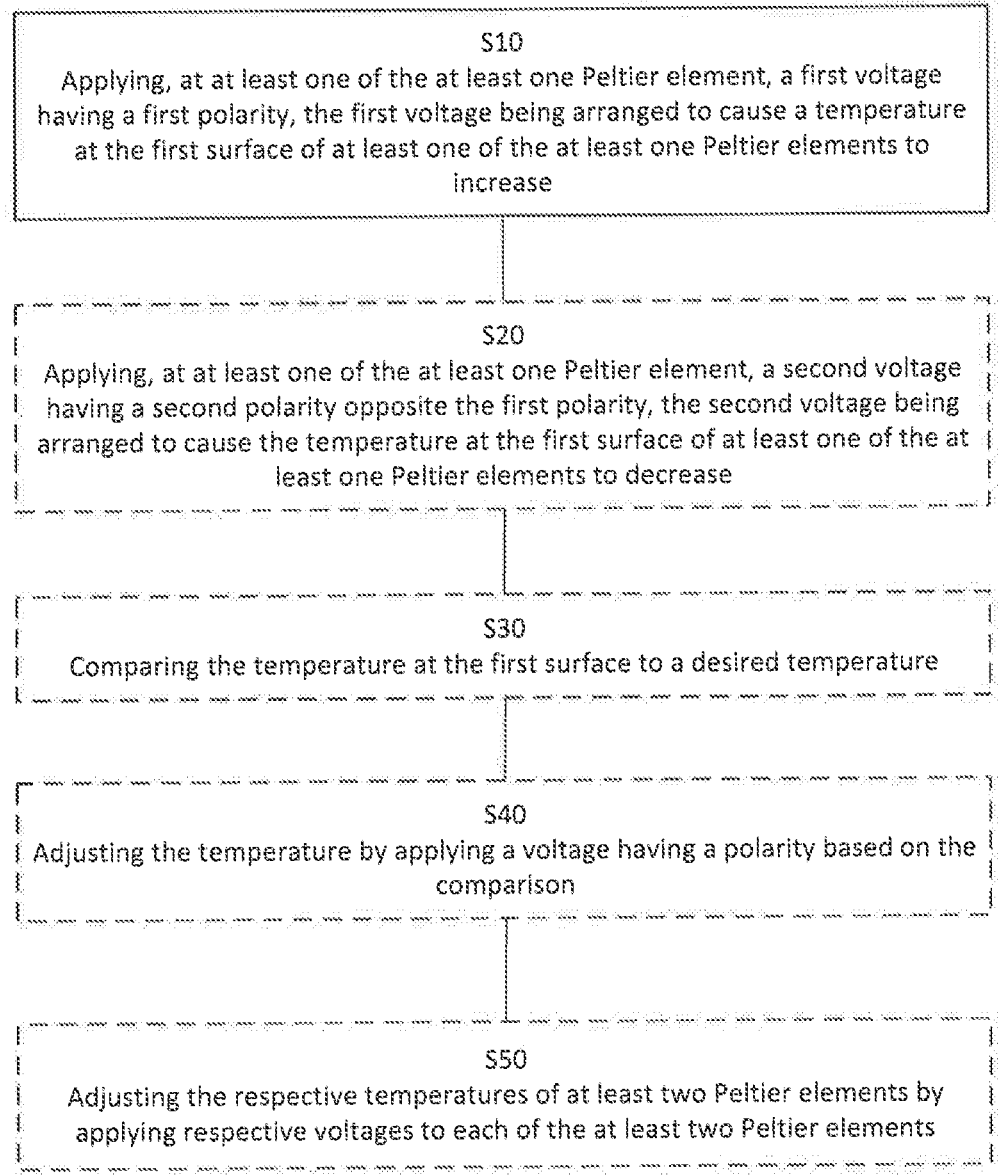

PRINT BEDS, 3-D PRINTERS, METHODS AND COMPUTER PROGRAMS FOR REGULATION OF A TEMPERATURE OF A PRINT BED

TECHNICAL FIELD

The present disclosure relates to the field of additive manufacturing. In particular, it relates to heated print beds, 3D-printers comprising heated print beds, and methods, computer programs and modules for controlling the disclosed heated print beds.

BACKGROUND ART

Heated print beds, also called heat beds, are often used in additive manufacturing, also called 3D-printing, because the heated bed can improve print quality by preventing warping of extruded plastic by keeping the extruded plastic warm. Since the material used expands and contracts depending on the temperature, the ability to keep the temperature of the print bed stable and accurate is of utmost importance. Furthermore, the use of different materials cooling at different rates and having different coefficients of thermal expansion provides additional challenges that remain to be addressed. There is thus a need in the art for print beds meeting the above mentioned challenges.

SUMMARY OF THE INVENTION

The present disclosure relates to regulation of a temperature of a print bed. The disclosure proposes a print bed for regulating a temperature of the print bed. The print bed comprises at least one Peltier element. Each Peltier element has opposite first and a second surfaces. The print bed further comprises at least one heatsink. The at least one Peltier element is arranged to have each respective first surface facing a print surface of the print bed. The at least one heatsink is thermally connected to the Peltier element and arranged to transfer heat generated by the at least one Peltier element and dissipate the transferred heat away from the at least one Peltier element. The disclosed print bed provides a means for both regulating the temperature up and down about a desired temperature, thereby enabling a temperature control which is both much more accurate and more responsive compared to conventional print beds using e.g., printed circuit boards, PCBs, or film heaters, such as a polyimide film. The ability to quickly change the Peltier element from heating a surface to cooling a surface by switching polarity of the applied voltage, i.e. driving the direct current through the Peltier element in the opposite direction, the print bed can be made to cool down much faster than conventional print beds, thereby preventing potential fire hazards and injuries resulting from leaving a hot print bed unattended after use. The ability to switch from heating to cooling enables improved temperature regulation over conventional heating elements only arranged to increase the temperature when needed.

According to some aspects, the print bed further comprises at least one fan. The at least one fan is arranged to transport gas heated by the at least one Peltier element away from the at least one Peltier element. According to some further aspects, the at least one fan comprises first and second fans, wherein the first fan is arranged at a first side of the print bed and the second fan is arranged at a second side of the print bed. The first and second sides are opposite each other. The first and second fans are arranged to suck in air towards the at least one heatsink via the first fan, through the at least one heat sink, and ultimately away from the at least one heatsink via the second fan. The fans enable efficient transport of hot gas, typically hot air, away from the heat sink, thereby preventing a buildup of unwanted heat in the vicinity of the print bed. The use of fans further facilitate the use of higher operating temperatures.

According to some aspects, the at least one Peltier element comprises a plurality of Peltier elements, and wherein each Peltier element is arranged to provide a respective temperature. According to some further aspects, the plurality of Peltier elements is arranged in a tessellation pattern. The plurality of Peltier elements enables varying the temperature over different regions of the print bed. Materials having different coefficients of thermal expansion can thereby be accommodated. Furthermore, warping of extruded plastic usually occurs due to edges of the printed material cooling faster than an interior region. The proposed print bed enables the use of temperature gradients, e.g. ensuring that the interior cools as fast as the edges of the printed material. According to some yet further aspects, at least two of the plurality of Peltier elements are arranged to be controlled by a common applied voltage. The at least two Peltier elements may be arranged in a serial or parallel connection.

The present disclosure also relates to a 3D-printer for regulating a temperature of a print bed. The 3D-printer comprises a print bed as described above and below. The 3D-printer further comprises a print chamber. The print bed is arranged inside the print chamber. The 3D-printer has all the technical effects and advantages of the disclosed print bed.

According to some aspects, the print chamber is a clean chamber arranged to provide a sealed environment for objects arranged within the clean chamber. This makes the 3D-printer particularly suitable for printing of organic materials, i.e. to function as a 3D-bioprinter.

According to some aspects, the 3D-printer further comprises at least one fan, wherein the at least one fan is arranged to transport gas heated by the at least one Peltier element outside of the 3D-printer. According to some further aspects, the at least one fan comprises first and second fans, wherein the first fan is arranged at a backside of the 3D-printer and the second fan is arranged at a front side of the 3D-printer. The first and second fans being arranged to suck in air from the print chamber, through the at least one heat sink, and ultimately outside of the printer. The fans enable efficient transport of hot gas, typically hot air, away from the heat sink, thereby preventing a buildup of unwanted heat in the vicinity of the print bed. The use of fans further facilitates the use of higher operating temperatures.

According to some aspects, the 3D-printer further comprises at least one duct, wherein the at least one duct is arranged to guide gas flow generated by the at least one fan. The ducts enable efficient transport of gas, which enables a more compact design. The ducts may be combined with a clean chamber to generate a pressure difference between the clean chamber and the surrounding environment. The pressure difference reduces inflow of particles from the surrounding environment, thereby protecting the print environment inside the clean chamber from contamination.

According to some aspects, the 3D-printer further comprises at least one filter. The at least one filter is arranged between the print bed and a volume external to the print chamber. The at least one filter thereby being arranged to filter out any unwanted particles in the gas flowing out of the 3D-printer.

According to some aspects, the 3D-printer further comprises direct current, DC, control circuitry arranged to apply first and second voltages to the at least one Peltier element. The first and second voltages have a first and second polarity respectively. The first and second voltages are arranged to cause a temperature at the first surface of at least one of the at least one Peltier elements to increase or decrease, respectively. The print bed of the 3D-printer can thereby provide different temperatures at different regions on the print surface of the print bed, as described above and below.

The present disclosure also relates to a method for regulating a temperature of a print bed. The print bed is a print bed according to the present disclosure. The method comprises applying, at at least one of the at least one Peltier element, a first voltage having a first polarity. The first voltage is arranged to cause a temperature at the first surface of at least one of the at least one Peltier elements to increase.

According to some aspects, the method further comprises applying, at at least one of the at least one Peltier element, a second voltage having a second polarity opposite the first polarity. The second voltage is arranged to cause the temperature at the first surface of at least one of the at least one Peltier elements to decrease.

According to some aspects, the method further comprises comparing the temperature at the first surface to a desired temperature, and adjusting the temperature by applying a voltage having a polarity based on the comparison.

By regulating the temperature up and down, greater control and flexibility of the print bed temperature is enabled. For instance, a desired temperature can be reached more quickly with respect to conventional print beds, without fear of overshooting. Furthermore, deviations from the desired temperature can be adjusted in both directions, up and down, enabling better precision and a more stable temperature compared to conventional print beds.

According to some aspects, the method further comprises adjusting the respective temperatures of at least two Peltier elements by applying respective voltages to each of the at least two Peltier elements. The print bed may thereby assume different temperatures in different regions, as disclosed above and below. According to some aspects, at least two of the plurality of Peltier elements are arranged to be controlled by a common applied voltage. The at least two Peltier elements may be arranged in a serial or parallel connection.

The present disclosure also relates to a computer program comprising computer program code which, when executed, causes a print bed as disclosed above and below to carry out the method as disclosed above and below. The computer program has all the technical effects and advantages of the disclosed method.

The present disclosure also relates to modules implementing the disclosed method. The modules may be implemented as control circuitry, software or any combination thereof. In particular, the present disclosure relates to a first voltage applying module M1 arranged to apply, at at least one of the at least one Peltier element, a first voltage having a first polarity. The first voltage is arranged to cause a temperature at the first surface of at least one of the at least one Peltier elements to increase. The present disclosure further relates to a second voltage applying module M2 arranged to apply, at at least one of the at least one Peltier element, a second voltage having a second polarity opposite the first polarity. The second voltage is arranged to cause the temperature at the first surface of at least one of the at least one Peltier elements to decrease. The present disclosure also relates to a comparison module M30 arranged to compare the temperature at the first surface to a desired temperature. The present disclosure additionally relates to a temperature adjusting module M40 arranged to adjust the temperature by applying a voltage having a polarity based on the comparison. The present disclosure further relates to a plural temperature adjusting module M50 arranged to adjust the respective temperatures of at least two Peltier elements by applying respective voltages to each of the at least two Peltier elements. The modules have all the technical effects and advantages of the disclosed method.

BRIEF DESCRIPTION OF THE DRAWINGS

FIG. 4 illustrates method steps of the disclosed method; and

DETAILED DESCRIPTION

Figure 1A:
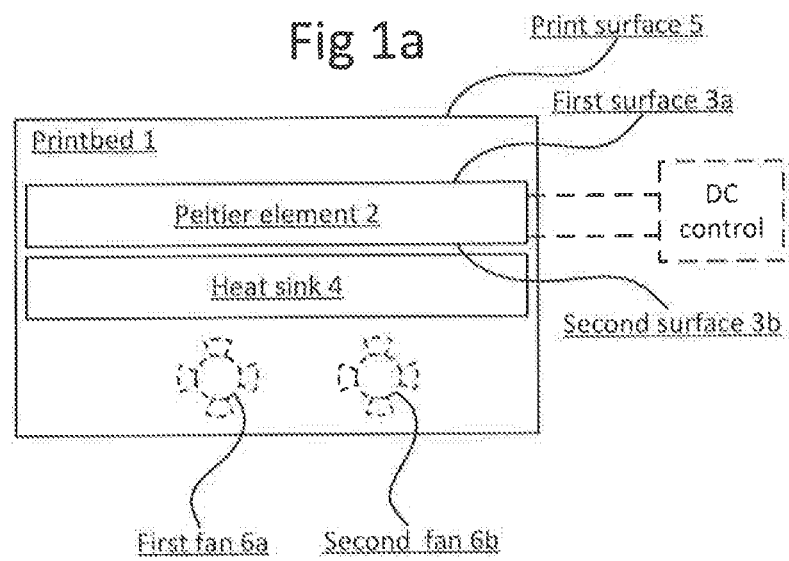
FIGS. 1a-1b illustrate block and perspective diagrams of the disclosed heatbed, respectively.
Figure 1B:
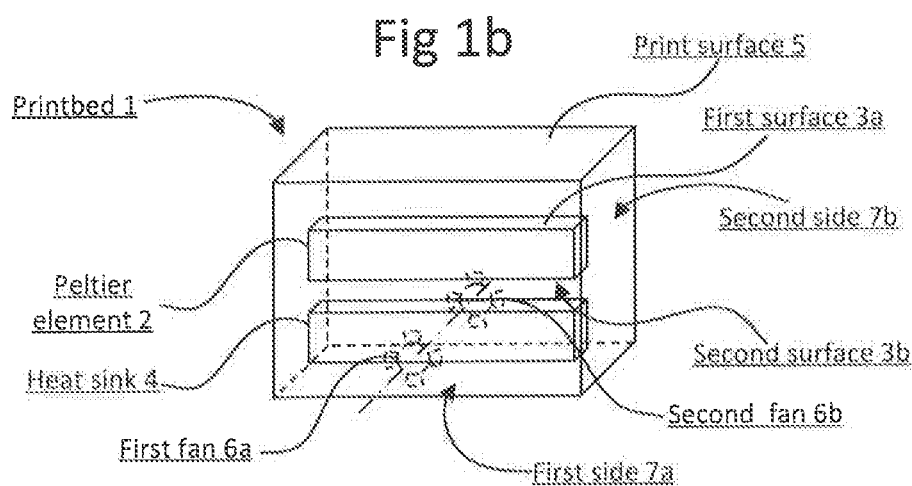

FIGS. 1a-1b illustrate block and perspective diagrams of the disclosed heatbed, respectively.

Disclosed is a print bed for regulating a temperature of the print bed. The print bed comprises at least one Peltier element. Each Peltier element has opposite first and a second surfaces. The print bed further comprises at least one heatsink. The at least one Peltier element is arranged to have each respective first surface facing a print surface of the print bed. The at least one heatsink is thermally connected to the Peltier element and arranged to transfer heat generated by the at least one Peltier element and dissipate the transferred heat away from the at least one Peltier element. The disclosed print bed provides a means for both regulating the temperature up and down about a desired temperature, thereby enabling a temperature control which is both more accurate and more responsive compared to conventional print beds using e.g., printed circuit boards, PCBs, or film heaters, such as a polyimide film. The ability to quickly change the Peltier element from heating a surface to cooling a surface by switching polarity of the applied voltage, i.e. driving the direct current through the Peltier element in the opposite direction, the print bed can be made to cool down much faster than conventional print beds, thereby preventing potential fire hazards and injuries resulting from leaving a hot print bed unattended after use. The ability to switch from heating to cooling enables improved temperature regulation over conventional heating elements only arranged to increase the temperature when needed. The Peltier elements is preferably controlled by direct current, DC, or, equivalently, direct voltage circuitry. The control circuitry may be arranged at the print bed, at a 3D-printer at which the print bed is arranged, or via a device external to both the print bed and the 3D-printer. The external device may be an external DC power source arranged to provide direct current/voltage to the Peltier element(s) of the print bed. Control signals arranged to control the print bed may come from control circuitry arranged at the print bed, the 3D-printer at which the print bed is arranged or via a device external to both the print bed and the 3D-printer. A common example of external devices for control of the 3D-printer and/or the print bed is a computer communicatively connected to the 3D-printer and/or the print bed. The communicative connection may comprise any combination of wired, optical (including infrared) and wireless communication.

According to some aspects, the print bed further comprises at least one fan. The at least one fan is arranged to transport gas heated by the at least one Peltier element away from the at least one Peltier element. According to some further aspects, the at least one fan comprises first and second fans, wherein the first fan is arranged at a first side of the print bed and the second fan is arranged at a second side of the print bed. The first and second sides are opposite each other. The first and second fans are arranged to suck in air towards the at least one heatsink via the first fan, through the at least one heat sink, and ultimately away from the at least one heatsink via the second fan, see FIG. 1b. The fans enable efficient transport of hot gas, typically hot air, away from the heat sink, thereby preventing a buildup of unwanted heat in the vicinity of the print bed. The use of fans further facilitates the use of higher operating temperatures.

According to some aspects, the at least one Peltier element comprises a plurality of Peltier elements, and wherein each Peltier element is arranged to provide a respective temperature. According to some further aspects, the plurality of Peltier elements is arranged in a tessellation pattern. The plurality of Peltier elements enables varying the temperature over different regions of the print bed. Materials having different coefficients of thermal expansion can thereby be accommodated. Furthermore, warping of extruded plastic usually occurs due to edges of the printed material cooling faster than an interior region. The proposed print bed enables the use of temperature gradients, e.g. ensuring that the interior cools as fast as the edges of the printed material. According to some aspects, at least two of the plurality of Peltier elements are arranged to be controlled by a common applied voltage. The at least two Peltier elements may be arranged in a serial or parallel connection with respect to the common applied voltage.

According to some aspects, the print bed is equipped with a needle probing station which has mechanical switches to determine the X, Y and Z position in space of each individual printhead.

Figure 2:
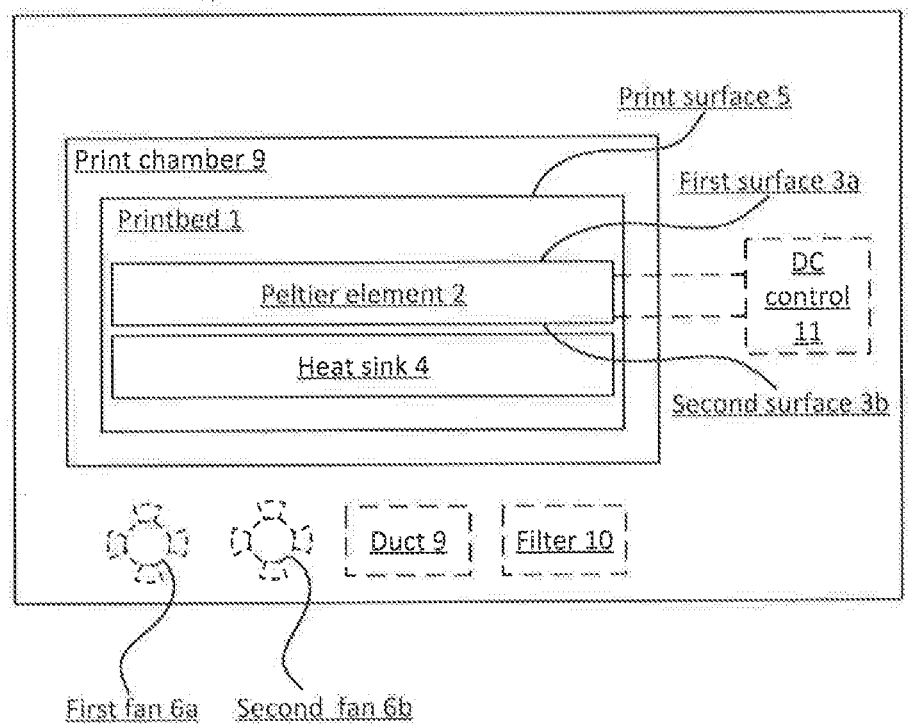
FIG. 2 illustrates a block diagram of a 3D-printer according to the present disclosure.

FIG. 2 illustrates a block diagram of a 3D-printer for regulating a temperature of a print bed. The 3D-printer comprises a print bed as described above and below. The 3D-printer further comprises a print chamber. The print bed is arranged inside the print chamber. The 3D-printer has all the technical effects and advantages of the disclosed print bed.

According to some aspects, the print chamber is a clean chamber arranged to provide a sealed environment for objects arranged within the clean chamber. This makes the 3D-printer particularly suitable for printing of organic materials, i.e. to function as a 3D-bioprinter.

According to some aspects, the 3D-printer further comprises at least one fan, wherein the at least one fan is arranged to transport gas heated by the at least one Peltier element outside of the 3D-printer. According to some further aspects, the at least one fan comprises first and second fans, wherein the first fan is arranged at a backside of the 3D-printer and the second fan is arranged at a front side of the 3D-printer. The first and second fans being arranged to suck in air from the print chamber, through the at least one heat sink, and ultimately outside of the printer. The fans enable efficient transport of hot gas, typically hot air, away from the heat sink, thereby preventing a buildup of unwanted heat in the vicinity of the print bed. In particular, the fans are arranged to move heat away from the hot side of the Peltier element when cooling, thereby increasing the effectiveness of the Peltier element to cool down the print surface of the print bed. The use of fans further facilitates the use of higher operating temperatures.

According to some aspects, the 3D-printer further comprises at least one duct, wherein the at least one duct is arranged to guide gas flow generated by the at least one fan. The ducts enable efficient transport of gas, which enables a more compact design. The ducts may be combined with a clean chamber to generate a pressure difference between the clean chamber and the surrounding environment. The pressure difference reduces inflow of particles from the surrounding environment, thereby protecting the print environment inside the clean chamber from contamination.

According to some aspects, the 3D-printer further comprises at least one filter. The at least one filter is arranged between the print bed and a volume external to the print chamber. The at least one filter thereby being arranged to filter out any unwanted particles in the gas flowing out of the 3D-printer.

According to some aspects, the 3D-printer further comprises direct current, DC, control circuitry arranged to apply first and second voltages to the at least one Peltier element. The first and second voltages have a first and second polarity respectively. The first and second voltages are arranged to cause a temperature at the first surface of at least one of the at least one Peltier elements to increase or decrease, respectively. The print bed of the 3D-printer can thereby provide different temperatures at different regions on the print surface of the print bed, as described above and below.

According to some aspects, the 3D-printer is equipped with a needle probing station which has mechanical switches to determine the X, Y and Z position in space of each individual printhead.

Figure 3:
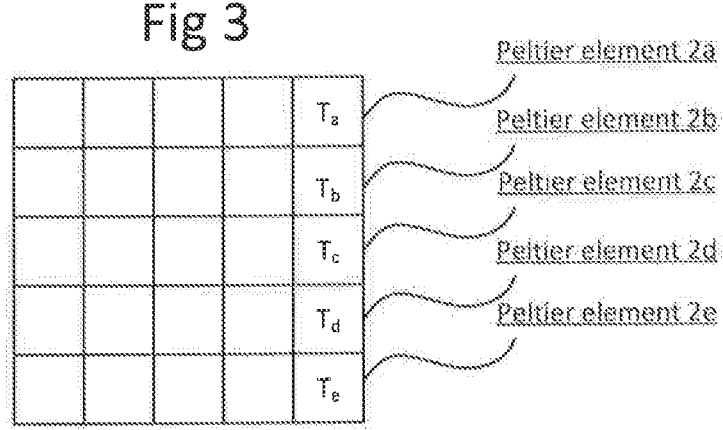
FIG. 3 illustrates a top view of a print bed comprising a plurality of Peltier elements arranged in a tessellation pattern.

FIG. 3 illustrates a top view of a print bed as described above and below, wherein the print bed comprises a plurality of Peltier elements arranged in a tessellation pattern. The Peltier elements are illustrates as rectangular, but may in principle have any shape. The plurality of Peltier elements may also be arranged to provide varying shapes of the surfaces, not only rectangular or quadratic. The tessellation pattern may include spaces between the Peltier elements, e.g. to provide room for thermal expansion. The Peltier elements may be arranged to provide temperature gradients on the print surface of the print bed.

FIG. 4 illustrates method steps of a method for regulating a temperature of a print bed. The print bed is a print bed as illustrated above and below. The method comprises applying, at at least one of the at least one Peltier element, a first voltage having a first polarity. The first voltage is arranged to cause a temperature at the first surface of at least one of the at least one Peltier elements to increase.

According to some aspects, the method further comprises applying, at at least one of the at least one Peltier element, a second voltage having a second polarity opposite the first polarity. The second voltage is arranged to cause the temperature at the first surface of at least one of the at least one Peltier elements to decrease.

According to some aspects, the method further comprises comparing the temperature at the first surface to a desired temperature, and adjusting the temperature by applying a voltage having a polarity based on the comparison.

By regulating the temperature up and down, greater control and flexibility of the print bed temperature is enabled. For instance, a desired temperature can be reached more quickly with respect to conventional print beds, without fear of overshooting. Furthermore, deviations from the desired temperature can be adjusted in both directions, up and down, enabling better precision and a more stable temperature compared to conventional print beds.

According to some aspects, the method further comprises adjusting the respective temperatures of at least two Peltier elements by applying respective voltages to each of the at least two Peltier elements. The print bed may thereby assume different temperatures in different regions, as disclosed above and below.

The present disclosure also relates to a computer program comprising computer program code which, when executed, causes a print bed as disclosed above and below to carry out the method as disclosed above and below.

Figure 5:
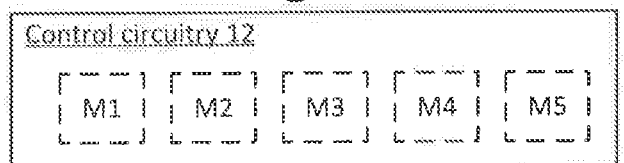
FIG. 5 illustrates modules implementing the disclosed method.

FIG. 5 illustrates modules implementing the disclosed method. The modules may be implemented as control circuitry, software or any combination thereof. In particular, the present disclosure relates to a first voltage applying module M1 arranged to apply, at at least one of the at least one Peltier element, a first voltage having a first polarity. The first voltage is arranged to cause a temperature at the first surface of at least one of the at least one Peltier elements to increase. The present disclosure further relates to a second voltage applying module M2 arranged to apply, at at least one of the at least one Peltier element, a second voltage having a second polarity opposite the first polarity. The second voltage is arranged to cause the temperature at the first surface of at least one of the at least one Peltier elements to decrease. The present disclosure also relates to a comparison module M30 arranged to compare the temperature at the first surface to a desired temperature. The present disclosure additionally relates to a temperature adjusting module M40 arranged to adjust the temperature by applying a voltage having a polarity based on the comparison. The present disclosure further relates to plural temperature adjusting module M50 arranged to adjust the respective temperatures of at least two Peltier elements by applying respective voltages to each of the at least two Peltier elements.

The invention claimed is:

1. A 3D bioprinter for regulating a temperature of a print bed, the 3D-bioprinter comprising
a print chamber,
a print bed arranged inside the print chamber of the 3D bioprinter, the print bed comprising
at least one Peltier element, each Peltier element having opposite first and a second surfaces; and
at least one heatsink,
wherein the at least one Peltier element is arranged to have each respective first surface facing a print surface of the print bed, and
wherein the at least one heatsink is thermally connected to the at least one Peltier element and arranged to transfer heat generated by the at least one Peltier element and dissipate the transferred heat away from the at least one Peltier element, and
at least one fan arranged at the print bed and arranged to transport gas heated by the at least one Peltier element away from the at least one Peltier element and the at least one heatsink,
wherein the at least one fan comprises first and second fans, wherein the first fan is arranged at a first side of the print bed and the second fan is arranged at a second side of the print bed, the first and second sides being opposite each other, the first and second fans being arranged to suck in air towards the at least one heatsink via the first fan, through the at least one heat sink, and ultimately away from the at least one heatsink via the second fan.

2. The 3D bioprinter according to claim 1, wherein the at least one Peltier element comprises a plurality of Peltier elements, and wherein each Peltier element is arranged to provide a respective temperature.

3. The 3D bioprinter according to claim 2, wherein the plurality of Peltier elements is arranged in a tessellation pattern.

4. The 3D bioprinter according to claim 1, wherein the print chamber is a clean chamber arranged to provide a sealed environment for objects arranged within the clean chamber.

5. The 3D bioprinter according to claim 1,
wherein the first fan is arranged at a backside of the 3D bioprinter and the second fan is arranged at a front side of the 3D bioprinter, the first and second fans being arranged to suck in air from the print chamber, through the at least one heat sink, and ultimately outside of the printer.

6. The 3D bioprinter according to claim 1, wherein
the at least one fan is arranged to transport gas heated by the at least one Peltier element outside of the 3D bioprinter.

7. The 3D bioprinter according to claim 6, further comprising
at least one duct, wherein the at least one duct is arranged to guide gas flow generated by the at least one fan.

8. The 3D bioprinter according to claim 6 further comprising
at least one filter, wherein the at least one filter is arranged between the print bed and a volume external to the print chamber, the at least one filter thereby being arranged to filter out any unwanted particles in the gas flowing out of the 3D bioprinter.

9. The 3D bioprinter according claim 1, further comprising
direct current control circuitry arranged to apply first and second voltages to the at least one Peltier element, the first and second voltages having a first and second polarity respectively, the first and second voltages being arranged to cause a temperature at the first surface of at least one of the at least one Peltier elements to increase or decrease, respectively.

* * * * *